United States Patent
Taylor et al.

(10) Patent No.: US 7,376,694 B2
(45) Date of Patent: *May 20, 2008

(54) COALESCING INFORMATION FROM MULTIPLE SOURCES BASED ON PRIORITY RULES

(75) Inventors: Dale T. Taylor, Lindon, UT (US); Dave L. Matheny, South Jordan, UT (US)

(73) Assignee: Intel Corporation, Santa Clara, CA (US)

( * ) Notice: Subject to any disclaimer, the term of this patent is extended or adjusted under 35 U.S.C. 154(b) by 1079 days.

This patent is subject to a terminal disclaimer.

(21) Appl. No.: 09/891,225

(22) Filed: Jun. 26, 2001

(65) Prior Publication Data

US 2003/0009550 A1    Jan. 9, 2003

(51) Int. Cl.
*G06F 13/00* (2006.01)

(52) U.S. Cl. ............. 709/202; 709/236; 709/217; 707/1; 707/10

(58) Field of Classification Search ........... 709/202, 709/201, 217, 236; 707/1–100
See application file for complete search history.

(56) References Cited

U.S. PATENT DOCUMENTS

| 6,751,663 | B1 * | 6/2004 | Farrell et al. ............. 709/224 |
| 6,880,005 | B1 * | 4/2005 | Bell et al. ................. 709/225 |
| 2002/0062241 | A1 * | 5/2002 | Rubio et al. .............. 705/10 |
| 2002/0161883 | A1 * | 10/2002 | Matheny et al. .......... 709/224 |
| 2003/0126136 | A1 * | 7/2003 | Omoigui ................... 707/10 |
| 2004/0030741 | A1 * | 2/2004 | Wolton et al. ............ 709/202 |
| 2004/0230571 | A1 * | 11/2004 | Robertson ................ 707/3 |

* cited by examiner

*Primary Examiner*—Kenneth R. Coulter
(74) *Attorney, Agent, or Firm*—Michael R. Barre

(57) ABSTRACT

An arrangement is provided for coalescing information from a plurality of agents according to priority rules. Each of the agents is associated with a device group that has at least one device and sends information about the at least one device to a priority rules-based coalescing mechanism. Upon receiving information from an agent, the priority rules-based coalescing mechanism retrieves relevant priority rules and coalesces the information according to those retrieved priority rules.

27 Claims, 8 Drawing Sheets

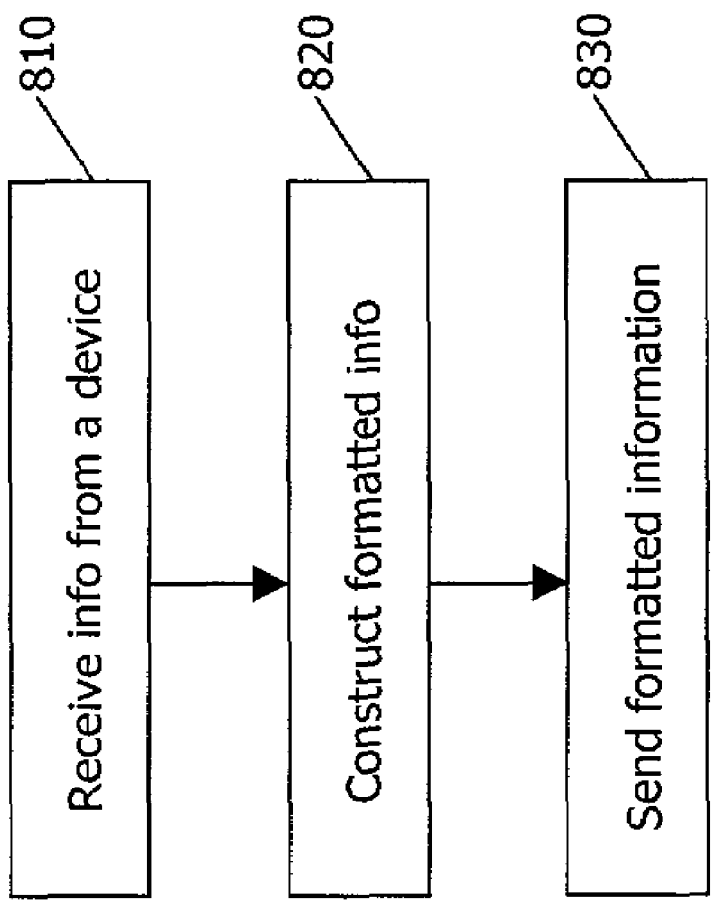

COALESCING INFORMATION FROM MULTIPLE SOURCES BASED ON PRIORITY RULES

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to gathering and use of information. Other aspects of the present invention relate to information synchronization.

In a society that is becoming increasingly networked, information is often gathered from different sources across a network and used to make various decisions. For example, managers of computer networks may use discovery agents to gather information from devices in the network. Examples of the information collected by discovery agents include operational status (e.g., the availability), transmission facilities (e.g., the bandwidth that a device can handle) of the underlying devices, or the capabilities of the installed devices which may include software and available hardware. Such collected information may be used to evaluate network performance such as determining the bottleneck of the network traffic, to determine the structure and the operation of the network, and to improve the network performance by reconfiguring the network based on the gathered information.

In a different application, database administrators may deploy similar agents to monitor data manipulation acts performed on devices that host different copies of the same data or to identify different versions of the same file stored on different devices. The information gathered from these monitoring agents may be used to determine appropriate consolidation operations to enforce data integrity. For example, a user may have a file stored on different devices with the same name (e.g., on a personal computer at home and on a Palm Pilot). The files with the same name may correspond to different versions of the same file that is edited under different circumstances (e.g., the user may have edited the file on the personal computer on Monday and edited it again while the user is on the road on Tuesday). An automated data administrator may automatically consolidate these different versions to maintain the data integrity of the file.

The aggregated information gathered from multiple sources (via or through agents) may contain duplicate data. For example, when a network manager sends inquiries to multiple agents to search for an available router device, more than one agent may respond (e.g., multiple routers are available). The inquiry from a database administrator to identify a file on different devices may yield multiple responses.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein:

FIG. 8 is an exemplary flowchart of a process, in which an agent supplies information to a priority rule-based coalescing mechanism in an asynchronous mode, according to a different embodiment of the present invention.

DETAILED DESCRIPTION

The inventions are described below, with reference to detailed illustrative embodiments. The inventions can be embodied in a wide variety of forms, some of which may be quite different from those of the disclosed exemplary embodiments. Consequently, the specific structural and functional detail is disclosed herein are merely representative and do not limit the scope of the invention.

The processing described below may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
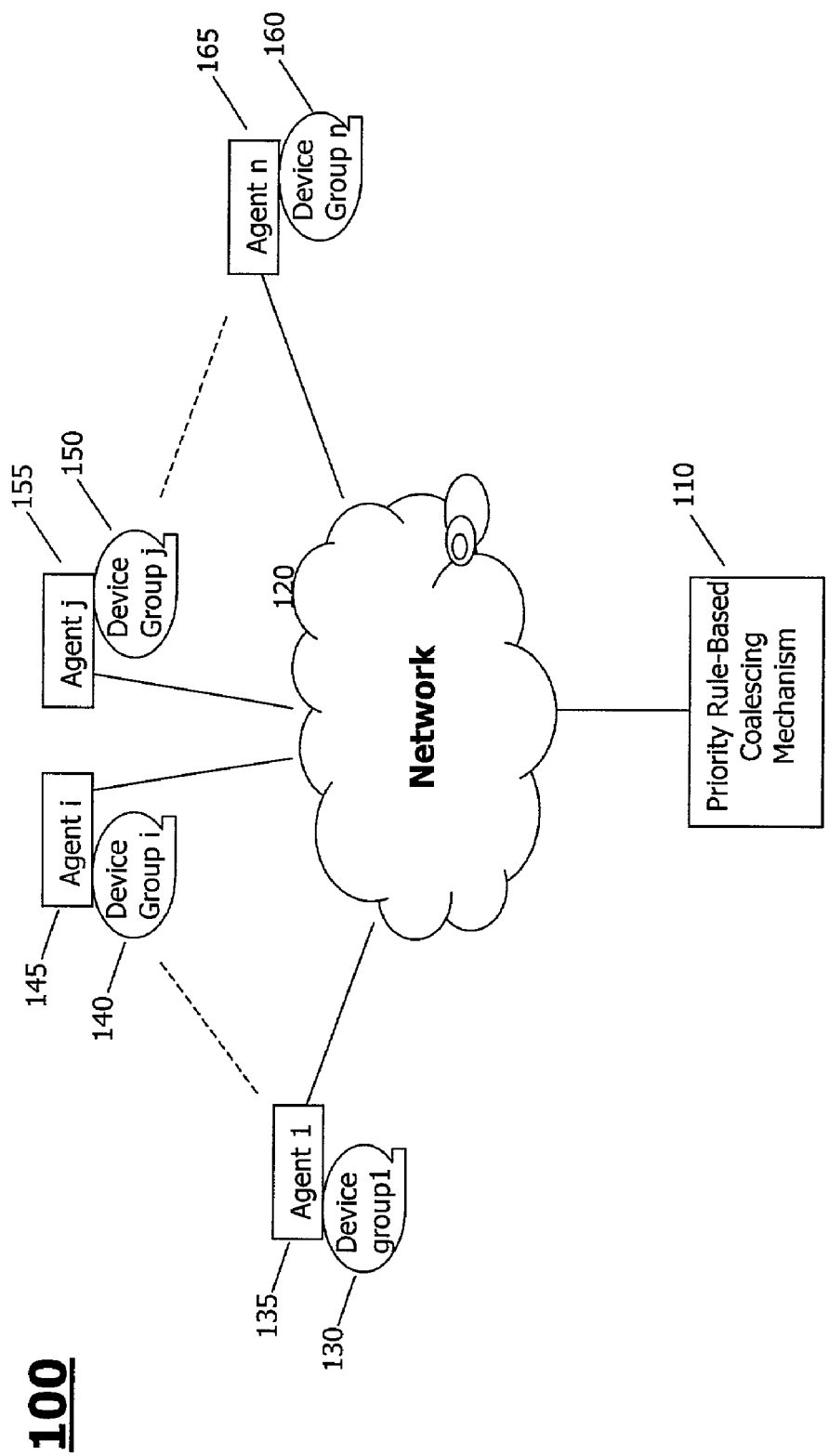
FIG. 1 depicts a high level architecture of embodiments of the present invention.

FIG. 1 depicts a high level architecture of embodiments of the present invention. In FIG. 1, a configuration 100, consistent with the present invention, comprises a plurality of n agents (agent 1, 135, . . . , agent i, 145, agent j, 155, . . . , agent n, 165) associated with a plurality of n corresponding device groups (device group 1, 130, . . . , device group i, 140, device group j, 150, . . . , device group n, 160) and a priority rule-based coalescing mechanism 110 connecting with the plurality of n agents via a network 120. The priority rule-based coalescing mechanism 110 in FIG. 1 receives information, related to the devices in the device groups, from the corresponding agents and coalesces the received information according to pre-defined priority rules.

Each of the device groups may include one or more devices (not shown in FIG. 1). Such a device represents a generic device that may be a computer, a disk drive, a router, a file system, or a home appliance. The devices in a single device group may all reside in a same Local Area Network (LAN) or they may be distributed in a Wide Area Network (WAN). The agent associated with a device group may communicate with the associated devices within a LAN, a WAN, or the Internet (not shown in FIG. 1). The network 120 in FIG. 1 connecting the agents (135, . . . ,145, 155, . . . ,165) and the priority rule-based coalescing mechanism 110 represents a generic network such as the Internet.

An agent connects to and communicates with the devices in its corresponding device group to, for example, acquire status information of the devices and to send such information to the priority rule-based coalescing mechanism 110 via the network 120. These devices may operate on different platforms (e.g., Unix platform and PC platform) or use different protocols (e.g., a computer and a home appliance such as a Video Cassette Recorder (VCR) may use different protocols) to communicate with their agent.

In configuration 100, an agent is capable of communicating with the devices in its device group that are running on different platforms and using different protocols. An agent serves as an interface between the devices in its device group and the priority rule-based coalescing mechanism 110. While interacting with the priority rule-based coalescing mechanism 110, a uniform schema or convention may be adopted. For example, a schema defined using the eXtensible Markup Language (XML) may be pre-specified to deliver the information from agents to the priority rule-based coalescing mechanism 110.

A device may send information as a response to its corresponding agent based on an inquiry. For example, an agent may query the status of a disk drive (a device) in its associated device group. An agent may query the timestamp of a particular file in a file system (a different device). A device may also send information to its associated agent based on its own initiative. For example, when a device finishes its current job and ready for other tasks, the device may actively send information to its associated agent to advertise its availability.

The priority rule-based coalescing mechanism 110 receives information from multiple sources (agents) and coalesces the received information based on certain priority rules. Such priority rules may specify the relative importance of different agents. The relative importance may be defined with respect to some criteria that may be specified according to application needs. A default priority may be assumed for an agent if no priority is defined explicitly. Priority rules provide a base for the priority rule-based coalescing mechanism 110 to prioritize the information from different sources.

In addition to the priority rules, the priority rule-based coalescing mechanism 110 may also integrate other types of information during coalescing. For example, a coalescing decision about the information relevant to a file may be made based on both the priority of the corresponding file manager (a device) as well as the timestamp of the file. For instance, if two copies (e.g., corresponding to different versions) of the same file (stored on different devices) have the same priority but one has a more recent timestamp, the one with the more recent timestamp may be kept during the coalescing and the other may be removed during the coalescing.

Priorities may also be defined with respect to devices in a device group. For example, a Central Processing Unit (CPU) of a computer in a device group, represented by an agent, may have a higher priority than a CPU of another computer in a different device group, represented by a different agent. The priority of a device in a device group may be inherited from the priority assigned to its associated agent or may be defined explicitly. When an explicit priority is assigned to a device, it may override the inherited priority of the device.

Figure 2:
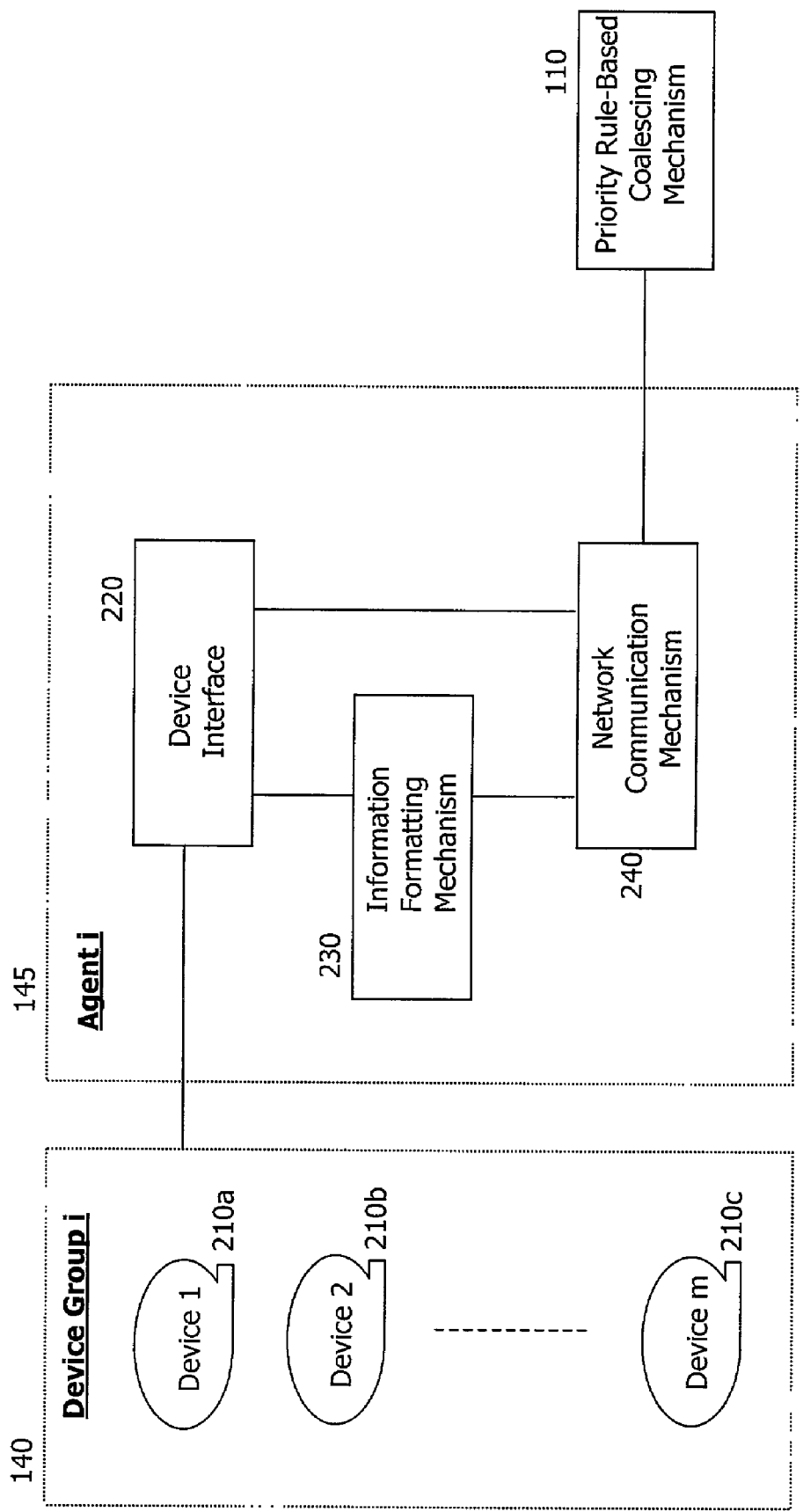
FIG. 2 depicts the internal structure of an agent interacting with a device group and a priority rule-based coalescing mechanism according to an embodiment of the present invention.

FIG. 2 depicts the internal structure of an agent (e.g., agent i, 145) interacting with a device group and the priority rule-based coalescing mechanism 110 according to an embodiment of the present invention. In FIG. 2, the agent i, 145, is connected to the device group i, 140, which comprises a plurality of devices, device 1, 210*a*, . . . , device i, 210*b*, . . . , device m, 210*c*. The agent 145 comprises a device interface 220, an information formatting mechanism 230, and a network communication mechanism 240. The device interface 220 is responsible for interacting with the devices (210*a*, . . . , 210*b*, . . . , 210*c*) in the device group 140 to send inquiries to and to receive information from the devices.

The information formatting mechanism 230 takes the information received from the devices and organizes it according to a pre-defined convention prior to sending the information to the priority rule-based coalescing mechanism 110. For example, if a file system sends a timestamp of a particular file together with the file name to the device interface (which may be subsequently sent to the priority rule-based coalescing mechanism 110), the information formatting mechanism 230 may organize the information according to a schema pre-specified in XML. The schema may specify tags for different types of information and how these tags are arranged. For example, according to a schema, a timestamp and the file name are placed into separate tag fields. Such a schema may be designed so that both the priority rule-based coalescing mechanism 110 and the agents 135, . . . , 145, 155, . . . , 165 can understand the information.

The formatted information generated by the information formatting mechanism 230, is sent to the priority rule-based coalescing mechanism 110 via the network communication mechanism 240. The network communication mechanism 240 is capable of interacting with the priority rule-based coalescing mechanism 110 using a protocol that is suitable for the network 120.

Figure 3:
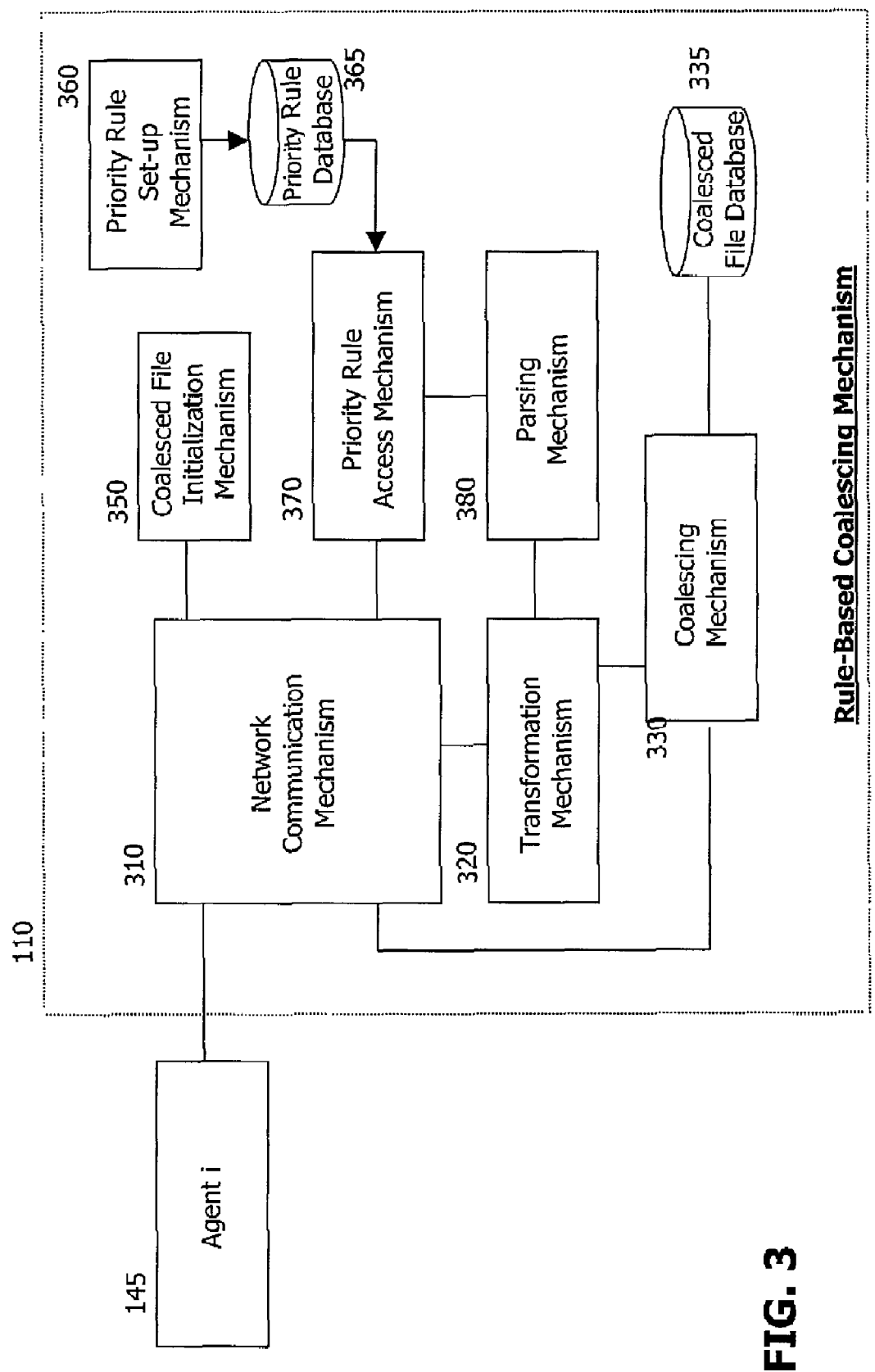
FIG. 3 depicts the internal structure of a priority rule-based coalescing mechanism according to embodiments of the present invention.

FIG. 3 depicts the internal structure of the priority rule-based coalescing mechanism 110 interacting with an agent (e.g., agent 145) according to embodiments of the present invention. The priority rule-based coalescing mechanism 110 includes a network communication mechanism 310, a transformation mechanism 320, a coalescing mechanism 330, a priority rule set-up mechanism 360, a coalesced file initialization mechanism 350, a priority rule access mechanism 370, a parsing mechanism 380, a priority rule database 365, and a coalesced file 335.

The responsibility of the priority rule-based coalescing mechanism 110 is to synchronize information from multiple sources. For example, different sources may send duplicate information or variants of the same information. Such information may have to be synchronized before it can be effectively used. The synchronization or coalescing may include removing duplicates or choosing one piece of specific information among a plurality of variants according to some criterion (which may be application dependent).

According to the present invention, criteria used to coalesce the information from multiple agents include priorities associated with different sources of information (agents). Such priorities are centrally set-up and controlled within the priority rule-based coalescing mechanism 110. That is, sources of the information (i.e., agents) send information without priority information or without concerning about the specifics of how the information will be processed or whether the information will be used (or kept).

In addition to the priorities, the priority rule-based coalescing mechanism 110 may also combine other types of information (e.g., parameters from devices) with the priorities during coalescing. For instance, the bandwidth of a router may be used, together with the priority of the router, to make a coalescing decision.

The network communication mechanism 310 is responsible for interacting with the agents (e.g., agent i, 145), including sending inquiries and receiving information from the agents. The interaction may be carried out through a pre-defined protocol or convention. For example, the information sent from the agents may be constructed according to a schema described using a standard language such as XML.

The priority rule set-up mechanism 360 initializes or updates the priority rules and stores the priority rules in the priority rule database 365. The priority rules may define the relative importance of both agents and devices and they may be specified in terms of certain structure expressed in an understood syntax.

Figure 4:
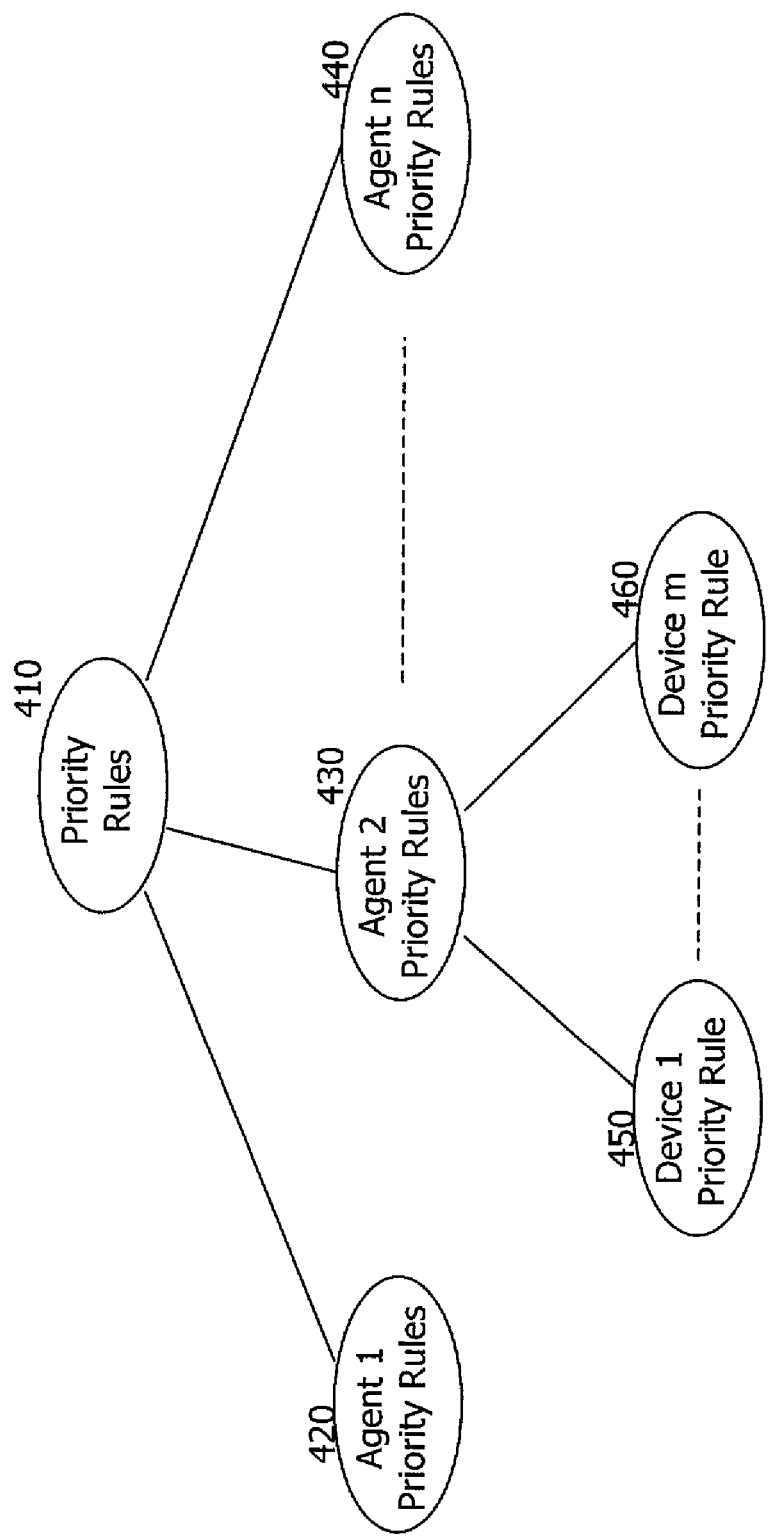
FIG. 4 shows an exemplary construct of priority rules according to an embodiment of the present invention.

FIG. 4 shows an exemplary construct of priority rules according to an embodiment of the present invention. Priority rules 410 stored in the priority rule database 365 comprise the priority rules for individual agents (agent 1 priority rules 420, agent 2 priority rules 430, . . . , agent n priority rules 440). The priority rules for a particular agent (e.g, agent 2 priority rules 430) may define both a priority for the agent and individual priority rules for different devices that are in the device group of the corresponding agent. For example, in FIG. 4, the agent 2 priority rules include device 1 priority rule 450, . . . , device m priority rule 460.

The structure of the priority rules may be defined as a schema specified in certain language. For example, XML may be used to specify the construct of priority rules. Below is an exemplary construct for priority rules specified in XML:

```
<priority>
    <agentname priority = "priority-value">
        <device1-tag> "priority-value" </device1-tag>
        <device2-tag> "priority-value" </device2-tag>
        .
        .
        .
        <deviceM-tag> "priority-value" </deviceM-tag>
    </agentname>
    .
    .
    .
</priority>
``` where <priority> . . . </priority> encloses the priority definition block which may include priority rule definitions for a plurality of agents, "agentname" corresponds to the identification of an agent, "priority" is a keyword denoting where the priority should be defined, "priority-value" may be a numeral defining a priority level, and </agentname> ends the definition of the priority for the agent named "agentname". According to the exemplary schema, device priorities may be defined inside the agent priority definition block (enclosed in <agentname> </agenmame>). In the above exemplary schema, "device-tag" identifies a device and the "priority-value" is a numeral defining the priority of the device named in "device-tag". Tag </device-tag> closes the priority definition block for the device. Based on the above exemplary schema, the following example shows priority rules defined according to the exemplary schema:

```
<priority>
    <agent1 priority = "10">
        <host> 2 </host>
        <URL> 4 </URL>
        <computer> 0 </computer>
    </agent1>
    <agent2>
        <host> 5 </host>
        <IPaddress> 3 </IPaddress>
        <MACaddress> 12 </MACaddress>
        <route> 10 </route>
    </agent2>
<priority>
```

In the above example, the priority for agent 1 is defined as level 10 and the priority of agent 2 is assumed default priority level, which may be pre-defined as, for example, level 0. A larger number may be defined to represent a higher priority. The devices associated with an agent may default to inherit the priority level assigned to their associated agent except when it is explicitly defined otherwise to override the inherited priority.

Devices associated with agent1 in the above example have, by default, precedence over any other device associated with other agents (all other agents in the above example have default priority level 0) except when it is explicitly defined differently. For instance, device "y" of agent1 has a higher priority (level 10—because it is not defined so it uses the default) than that of device "y" associated with agent2 (level 0). However, agent2's "MACaddress" has a higher priority than any other agent's "MACaddress" (because they are all default to level 0—except for agent1's which defaults to 10). Furthermore, in the above example, device "host" generated by agent2, if any, has a priority of 5 which overrides any "host" generated by any other agent including agent1 because it has been downgraded to level 2. The "route" generated by either agent1 or agent2 have the same level of priority (level 10). Depending on the specific implementation of the coalescing mechanism, information from agents with the same level of priority may be both kept in the final coalesced file. A coalescing mechanism may also be implemented to remove one using other criteria. Examples of other criteria may include timestamp or bandwidth. For instance, if two "routes" have the same priority but one allows higher bandwidth, the one with the higher bandwidth may be kept and the other may be removed from the coalesced file.

Referring back to FIG. 3, the role of the priority rule set-up mechanism 360 is to set up or update priority rules with respect to agents and the devices in their associated device groups. Priority rules may be updated when needed after the initial set-up. Such update may include adding new priority rules when new agents or new devices are added or deleting priority rules when the corresponding agents or devices are removed. Initial priority may also be changed which may either upgrades or downgrades the initial priority level.

Priority rules are stored in the priority rule database 365. The priority rule access mechanism 370 retrieves priority rules whenever it is needed. For example, it may be triggered to retrieve relevant priority rules when new information is received by the network communication mechanism 310 from an agent. Based on received information (e.g., from a particular agent), the network communication mechanism 310 may instruct the priority rule access mechanism 370 to retrieve the rules associated with the agent and its associated devices. Such retrieved priority rules may be fed to both the transformation mechanism 320 (explained later) and the parsing mechanism 380 to parse the rules before they can be used by the coalescing mechanism 330. Other embodiments (not shown in FIG. 3) may also be implemented in which the retrieved priority rules may be directly used by both the transformation mechanism 320 and the coalescing mechanism 330 without being parsed first.

According to the present invention, the agents do not concern (or have no knowledge) about the priority associated with them. The information sent from the agents does not include priority information. When information is received from an agent, associated priority information (retrieved by the priority rule access mechanism 370) may be incorporated into the received information before the information is coalesced. In FIG. 3, the transformation mechanism 320 takes the information received by the network communication mechanism 310 (from an agent) and the priority rules retrieved by the priority rule access mechanism 370 as input and generates modified information, in which each piece of information is coupled with appropriate priorities. For instance, if following information is received from an agent named "agent1":

<host> morgan </host>
<IPaddress> 128.34.56.78.9 </IPaddress>.

According to the priority rule for agent1 (discussed earlier), the agent1 has a priority level 10 and its associated "host" and "IPaddress" have priority levels 2 and 10, respectively. In this case, the transformation mechanism 320 may generate modified information as follows:

<host_pri_="2"> morgan </host>
<IPaddress_pri_="10"> 128.34.56.78.9 </IPaddress>.

Such modified information is fed to the coalescing mechanism 330. With appropriate priority information attached to the original information, the coalescing mechanism 330 coalesces the information accordingly and generates a coalesced file, which contains information that has been properly coalesced or synchronized. For example, duplicate information from multiple agents may be removed according to the priority rules.

As discussed earlier, the removal of a piece of information from a particular device may also be determined based on the operational parameters of the device. For example, if two devices have the same priority level but one has a higher computational power, the coalescing mechanism 330 may combine the priority with the computational power of the device and decides to retain the piece of information from the device with higher computational power. The coalesced file may be initially set up by the coalesced file initialization mechanism 350. The final coalesced file may be stored in the coalesced file database 335.

The coalescing mechanism 330 may perform coalescing in a different mode. One may be a synchronous mode and the other may be an asynchronous mode. In a synchronous mode, the coalescing mechanism 330 actively initiates each act in the coalescing process by sending an inquiry to an agent to collect information, coalescing the information, generating an updated coalesced file, and then moving on to the next agent. All is done in a synchronous fashion. In an asynchronous mode, the coalescing process is activated whenever information is received from an agent. That is, the coalescing process is activated by an agent.

In the synchronous mode, the priority rule-based coalescing mechanism 110 may actively send an inquiry, with a coalesced file containing information that has been properly coalesced, to an agent to collect information. To respond, the agent may simply append the requested information at the end of the coalesced file. When the appended coalesced file is returned to the priority rule-based coalescing mechanism 110, the appended information may be coalesced against the information that has been properly coalesced to generate an update coalesced file, which may then be passed onto the next agent.

In the asynchronous mode, the coalesced file may remain in the priority rule-based coalescing mechanism 110. When information is received by the network communication mechanism 310 from an agent, the coalescing mechanism 330 coalesces the newly received information against the information in the coalesced file to generate an update coalesced file.

Figure 5:
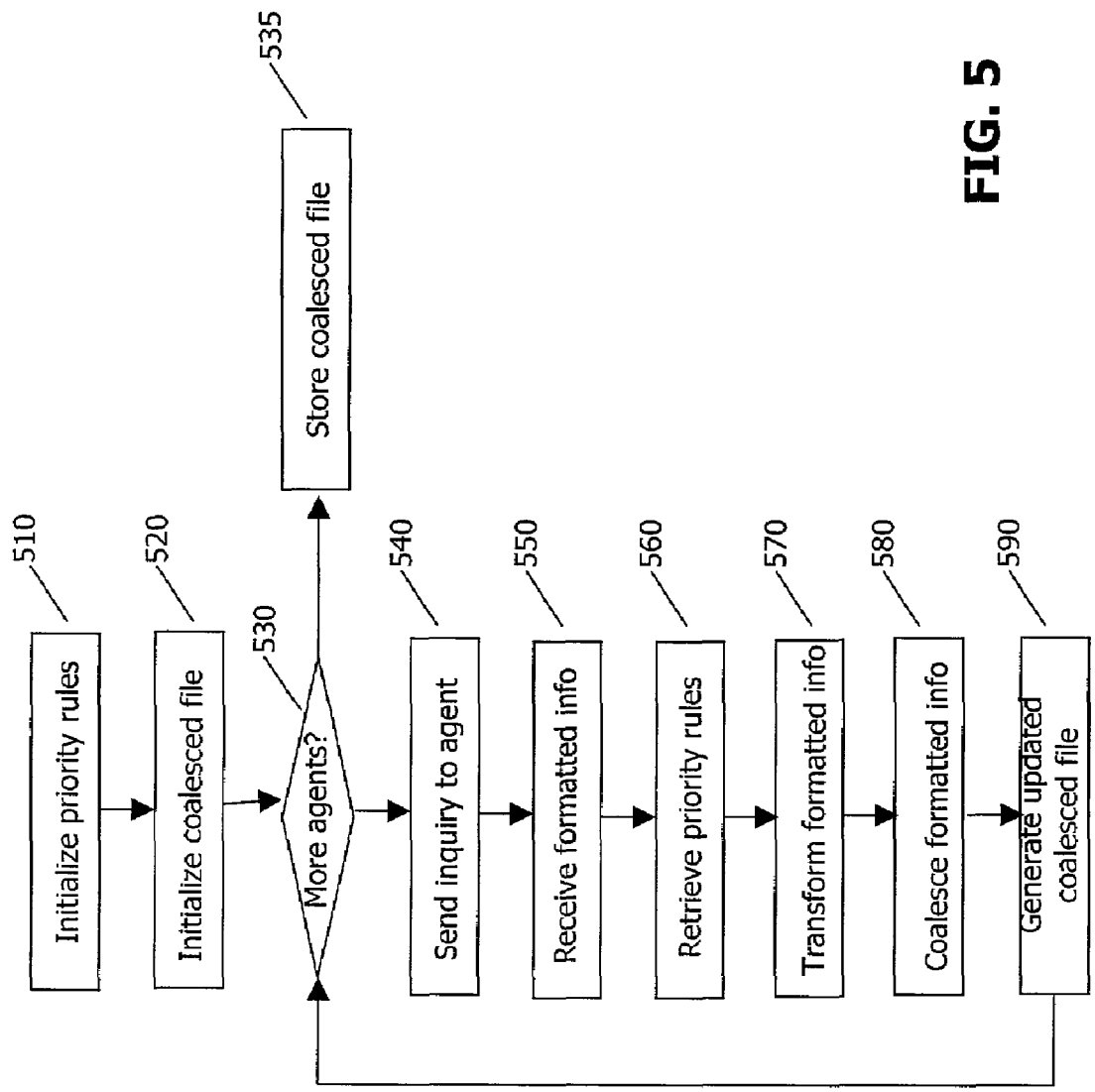
FIG. 5 is an exemplary flowchart of a process, in which information from different sources is coalesced, in a synchronous mode, based on priority rules according to an embodiment of the present invention.

FIG. 5 is an exemplary flowchart for the priority rule-based coalescing mechanism 110, in which information from different agents is coalesced, in a synchronous mode, based on priority rules according to an embodiment of the present invention. The priority rule set-up mechanism 360 first initializes or updates, at act 510, the priority rules and stores them in the priority rule database 365. To perform synchronous coalescing, the coalesced file initialization mechanism 350 constructs, at act 520, an initial coalesced file.

During the coalescing process, the coalesced file is sent, via the network communication mechanism 310, to each agent, connected to the priority rule-based coalescing mechanism 110, with an inquiry and the requested information is returned as an appended portion in the coalesced file and sent back to the network communication mechanism 310. The returned coalesced file containing the newly appended information is then coalesced to generate an update coalesced file in which all the information has been properly coalesced. The process continues until all the agents have been enumerated. When this happens, determined at act 530, the coalesced file is stored, at act 535, in the coalesced file database 335.

During the enumeration, when there is a next agent, determined at act 530, the network communication mechanism 310 sends, at act 540, an inquiry together with the current coalesced file to the next agent. When the network communication mechanism 310 receives, at act 550, returned information (formatted according to, for example, XML), the priority rule access mechanism 370 retrieves, at act 560, the priority rules associated with the next agent. The retrieved priority rules are used to transform, by the transformation mechanism 320 at act 570, the appended information to generate modified information with the predefined priorities incorporated. The modified information and the retrieved priority rules are used to coalesce, at act 580, the coalesced file to generate, at act 590, an updated coalesced file. The process then returns to act 530 to determine whether the enumeration continues.

Figure 6:
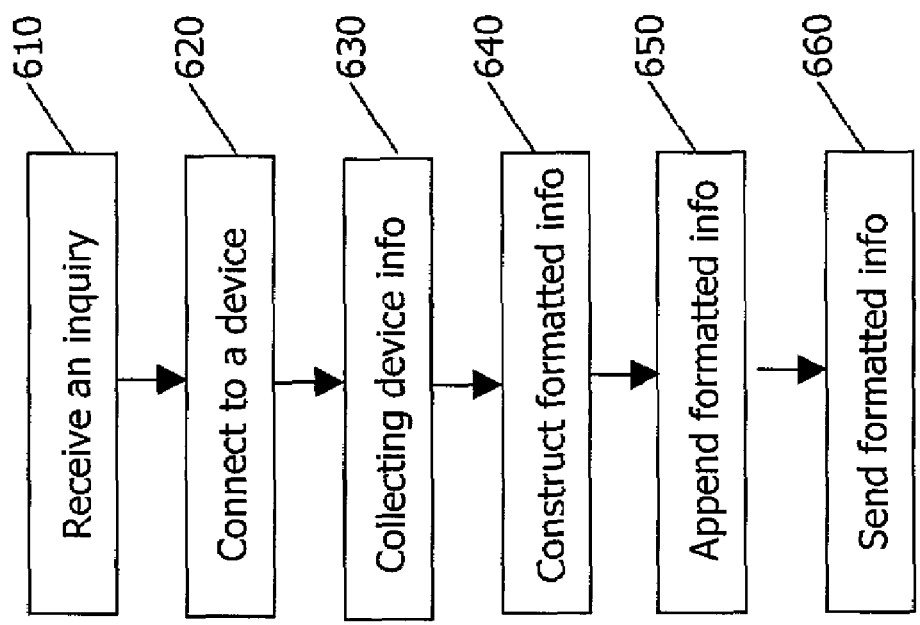
FIG. 6 is an exemplary flowchart of a process, in which an agent supplies information to a priority rule-based coalescing mechanism in a synchronous mode, according to an embodiment of the present invention.

FIG. 6 is an exemplary flowchart of a process, in which an agent supplies information to the priority rule-based coalescing mechanism 110 in a synchronous mode, according to an embodiment of the present invention. In FIG. 6, an agent receives, at act 610, an inquiry for information from the priority rule-based coalescing mechanism 110. The inquiry may be received with a coalesced file containing, for example, information that has been properly coalesced. The inquiry may request the agent to collect some information related to certain device such as the timestamp of a file under a file server.

Upon receiving the inquiry, the agent connects, at act 620, to the device and collects, at act 630, the requested information. Before sending the information back to the priority rule-based coalescing mechanism 110, the agent constructs, at act 640, formatted information according to a pre-defined schema or structure and appends, at act 650, the formatted information to the coalesced file. Then, the agent sends, at act 660, the formatted information with the appended coalesced file to the priority rule-based coalescing mechanism 110.

Figure 7:
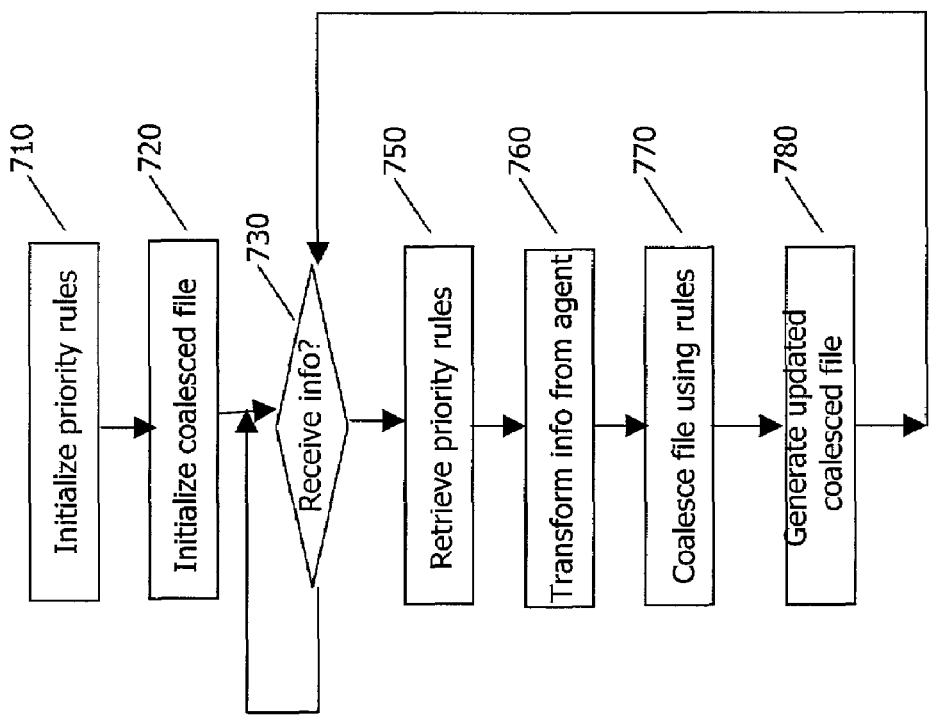
FIG. 7 is an exemplary flowchart of a process, in which information from different sources is coalesced, in an asynchronous mode, based on priority rules according to a different embodiment of the present invention.

FIG. 7 is an exemplary flowchart for the priority rule-based coalescing mechanism 110, in which information from different sources is coalesced, in an asynchronous mode, based on priority rules according to a different embodiment of the present invention. The priority rule set-up mechanism 360 first initializes or updates, at act 710, the priority rules and stores them in the priority rule database 365. The coalesced file initialization mechanism 350 initializes, at act 720, an initial coalesced file.

In an asynchronous mode, the priority rule-based coalescing mechanism 110 is activated to perform coalescing whenever information is received from an agent. In FIG. 7, when information is received from an agent, determined at act 730, the priority rule-based coalescing mechanism 110 retrieves, at act 750, relevant priority rules from the priority rule database 365. The received information is then, transformed, at act 760, using the retrieved priority rules to generate modified information (that incorporates the priority rules). The modified information is coalesced, at act 770, in relation to the content that is already in the coalesced file based on the priority rules. An updated coalesced file is generated, at act 780, based on the coalesced result.

FIG. 8 is an exemplary flowchart of a process, in which an agent supplies information to the priority rule-based coalescing mechanism 110 in an asynchronous mode, according to a different embodiment of the present invention. In an asynchronous mode, a device may actively send information to its agent. For example, a device may advertise its availability by sending information to its associated agent. An agent receives, at act 810, information from a device in its associated device group. Priori to forwarding the information to the priority rule-based coalescing mechanism 110, the agent constructs, at act 820, formatted information according to some pre-defined syntax or schema. The properly formatted information is then sent, at act 830, to the priority rule-based coalescing mechanism 110.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for a priority rule-based coalescing mechanism, comprising:
   receiving formatted information from an agent associated with a device group comprising devices capable of running on a plurality of different platforms using a plurality of different protocols, formatted information being constructed based on the information, obtained from the devices, according to a pre-defined syntax;
   retrieving priority rules associated with the agent from a priority rule database; and
   coalescing the formatted information based on the priority rules to generate an updated coalesced file.

2. The method according to claim 1, wherein the coalescing the formatted information comprises:
   coalescing the formatted information with respect to a coalesced file according to the priority rules; and
   generating the updated coalesced file based on the result from the coalescing.

3. The method according to claim 1, further comprising:
   setting up the priority rules associated with the agent prior to the retrieving; and
   transforming the formatted information prior to the coalescing according to the priority rules associated with the agent.

4. A method for a priority rule-based coalescing mechanism, comprising:
   sending an inquiry to an agent to gather information from a device group associated with the agent, the device group comprising devices capable of running on a plurality of different platforms using a plurality of different protocols;
   receiving formatted information from the agent, formatted information being constructed according to a pre-defined syntax;
   retrieving priority rules associated with the agent from a priority rule database; and coalescing the formatted information based on the priority rules to generate an updated coalesced file.

5. The method according to claim 4, wherein the sending an inquiry includes sending the inquiry with a coalesced file.

6. The method according to claim 5, wherein the receiving the formatted information includes receiving the formatted information with the coalesced file wherein the formatted information is appended.

7. A method, comprising:
   receiving, by an agent associating with a device group that comprises devices capable of running on a plurality of different platforms using a plurality of different protocols information pertaining to the devices;
   constructing formatted information based on the information received from the devices according to a pre-defined syntax;
   sending the formatted information to a priority rule-based coalescing mechanism;
   retrieving, by the priority rule-based coalescing mechanism, priority rules associated with the agent from a priority rule database; and
   coalescing the formatted information based on the priority rules to generate an update coalesced file.

8. The method according to claim 7, wherein the coalescing the formatted information comprises:
   coalescing the formatted information with respect to a coalesced file according to the priority rules; and
   generating the updated coalesced file based on the result from the coalescing.

9. The method according to claim 7, further comprising:
setting up the priority rules associated with the agent prior to the retrieving; and
transforming the formatted information prior to the coalescing formatted information according to the priority rules.

10. A method, comprising:
sending, by a priority rule-based coalescing mechanism, an inquiry to an agent to gather information from a device group associated with the agent, the device group comprising devices capable of running on a plurality of platforms using a plurality of protocols;
collecting, by the agent, the information from the device group according to the inquiry;
constructing formatted information based on the information obtained from the device group according to a pre-defined syntax;
sending the formatted information to the priority rule-based coalescing mechanism;
retrieving, by the priority rule-based coalescing mechanism, priority rules associated with the agent from a priority rule database; and
coalescing the formatted information based on the priority rules to generate an updated coalesced file.

11. The method according to claim 10, wherein the sending an inquiry includes sending the inquiry with a coalesced file.

12. The method according to claim 11, wherein the sending the formatted information comprises:
appending the formatted information, generated by the constructing, to the coalesced file; and
sending the coalesced file, appended with the formatted information, to the priority rule-based coalescing mechanism.

13. The method according to claim 10, wherein the constructing according to a pre-defined syntax includes constructing according to XML.

14. A priority rule-based coalescing mechanism, comprising:
a network communication mechanism for receiving formatted information from an agent coupled to a device group comprising devices capable of running on a plurality of platforms using a plurality of protocols the formatted information generated according to a pre-defined syntax;
a priority rule database for storing priority rules defined with respect to the agent; and
a coalescing mechanism for coalescing and synchronizing the formatted information in a coalesced file according to the priority rules retrieved from the priority rule database, the pre-defined syntax of the formatted information being recognized by the agent-and the coalescing mechanism, the coalescing mechanism further capable of generating an updated coalesced file.

15. The mechanism according to claim 14, further comprising:
a priority rule set-up mechanism for setting up the priority rules for the agent, the priority rules defining the priority of the agent;
a priority rule accessing mechanism for retrieving the priority rules, from the priority rule database after the formatted information is received from the agent, to provide associated priority rules to the coalescing mechanism to coalesce the formatted information.

16. The mechanism according to claim 15, further comprising:
a coalesced file initialization mechanism for initializing the coalesced file to which the agent appends formatted information;
a parsing mechanism for parsing the priority rules, retrieved by the priority rule access mechanism from the priority rule database, before the coalescing mechanism coalesces the formatted information;
a transformation mechanism for transforming the formatted information, before the formatted information is coalesced by the coalescing mechanism, according to the priority rules; and
a coalesced file database for storing the updated coalesced file, generated by the coalescing mechanism.

17. A computer-readable storage medium encoded with a program, the program, when executed causing:
sending, by a priority rule-based coalescing mechanism, an inquiry to an agent to gather information from a device group associated with the agent;
collecting, by the agent, the information from the device group according to the inquiry;
constructing formatted information based on the information obtained from the device group according to a pre-defined syntax;
sending the formatted information to the priority rule-based coalescing mechanism;
retrieving, by the priority rule-based coalescing mechanism, priority rules associated with the agent from a priority rule database; and
coalescing the formatted information based on the priority rules to generate an updated coalesced file.

18. The medium according to claim 17, wherein the sending of the formatted information comprises:
appending the formatted information, generated by the constructing, to a coalesced file that is received together with the inquiry; and
sending the coalesced file, appended with the formatted information, to the priority rule-based coalescing mechanism.

19. A computer-readable storage medium encoded with a program for a priority ride-based coalescing mechanism, the program, when executed causing:
sending an inquiry to an agent to gather information from a device group associated with the agent, the device group comprising devices capable of running on a plurality of different platforms using a plurality of different protocols;
receiving formatted information from the agent, formatted information being constructed according to a pre-defined syntax;
retrieving priority rules associated with the agent from a priority rule database; and
coalescing the formatted information based on the priority rules to generate an updated coalesced file.

20. The medium according to claim 19, wherein
the sending an inquiry includes sending the inquiry with a coalesced file;
the receiving the formatted information includes receiving the formatted information with the coalesced file wherein the formatted information is appended.

21. A computer-readable storage medium encoded with a program, the program, when executed, causing:
receiving, by an agent associating with a device group that comprises devices capable of running on a plurality of different platforms using a plurality of different protocols, information from the devices;

constructing formatted information based on the information received from the devices according to a pre-defined syntax;

sending the formatted information to a priority rule-based coalescing mechanism;

retrieving, by the priority rule-based coalescing mechanism, priority rules associated with the agent from a priority rule database; and coalescing the formatted information based on the priority rules to generate an updated coalesced file.

22. The medium according to claim 21, further comprising code, which when executed causes:

setting up the priority rules associated with the agent prior to the retrieving; and transforming the formatted information prior to the coalescing formatted information according to the priority rules.

23. A computer-readable storage medium encoded with a program for a priority rule-based coalescing mechanism, the program, when executed, causing:

receiving formatted information from an agent associated with a device group comprising devices capable of running on a plurality of different platforms using a plurality of different protocols, formatted information being constructed based on the information, obtained from the devices, according to a pre-defined syntax;

retrieving priority rules associated with the agent from a priority rule database; and coalescing the formatted information based on the priority rules to generate an updated coalesced file.

24. The medium according to claim 23, further comprising code, which when executed causes:

setting up the priority rules associated with the agent prior to the retrieving; and transforming the formatted information prior to the coalescing according to the priority rules associated with the agent.

25. A system, comprising:

a plurality of agents capable of receiving and sending formatted information from and to device groups, each of the device groups comprising devices capable of running on a plurality of different platforms using a plurality of different protocols via a network, the formatted information organized according to a pre-defined syntax; and a priority rule-based coalescing mechanism connecting to the plurality of agents via the network, the priority rule-based coalescing mechanism capable of coalescing the formatted information received from the plurality of agents, the pre-defined syntax of the formatted information being recognized by the plurality of agents and the priority rule-based coalescing mechanism, the priority rule-based coalescing mechanism further coalescing the formatted information within a coalesced file and synchronizing the coalesced file according to corresponding priority rules defined with respect to each of the plurality of agents, the synchronized coalesced file then being processed to generate an updated coalesced file.

26. The system according to claim 25, wherein each of the agents is associated with one of the device groups, each device group comprising at least one device and collecting information from the at least one device in the device group.

27. The system according to claim 26, wherein each of the plurality of agents comprises:

a device interface for interacting with the at least one device in the device group to collect information;

an information formatting mechanism for organizing the information, collected by the device interface from the at least one device, according to the pre-defined syntax to generate the formatted information; and a network communication mechanism for communicating with the priority rule-based coalescing mechanism, sending the formatted information to the priority rule-based coalescing mechanism via the network.

* * * * *